Aug. 22, 1939.  H. E. KITCHEN  2,170,608
GEAR GENERATOR
Filed Dec. 21, 1938  2 Sheets-Sheet 1
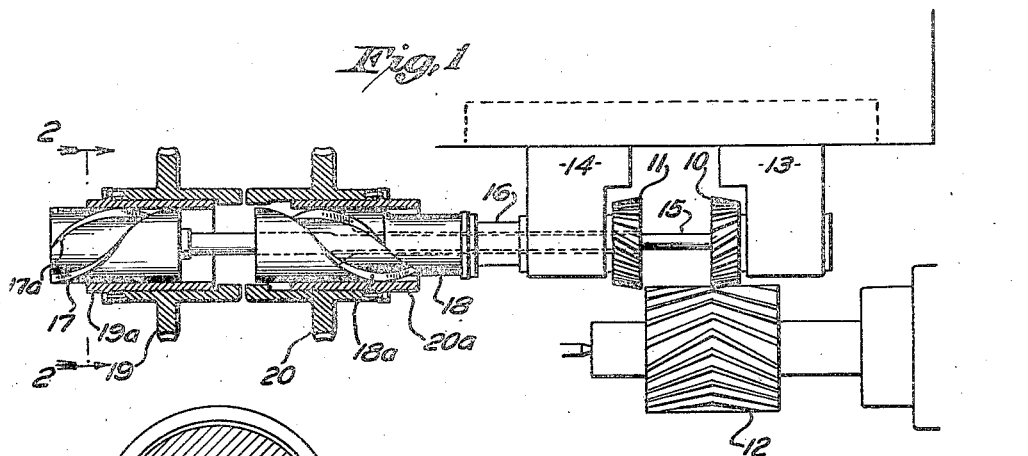
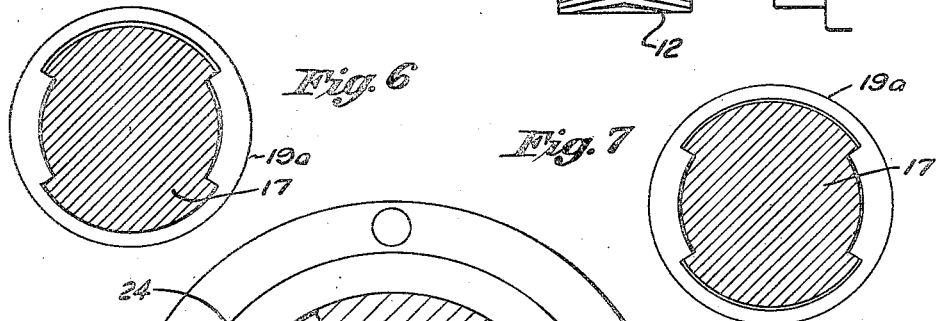
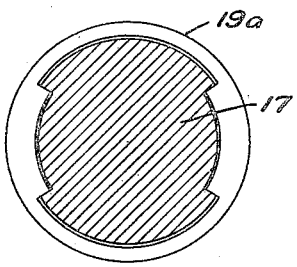
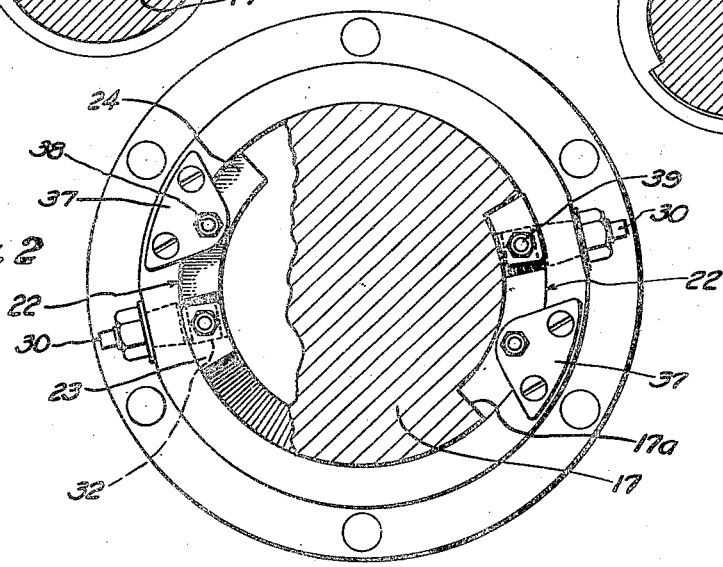
INVENTOR
Harry E. Kitchen
BY
ATTORNEY Aug. 22, 1939.   H. E. KITCHEN   2,170,608
GEAR GENERATOR
Filed Dec. 21, 1938   2 Sheets-Sheet 2
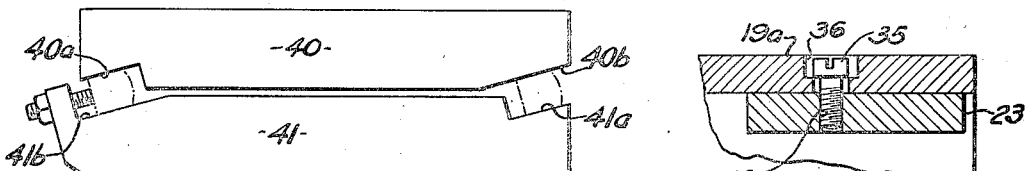
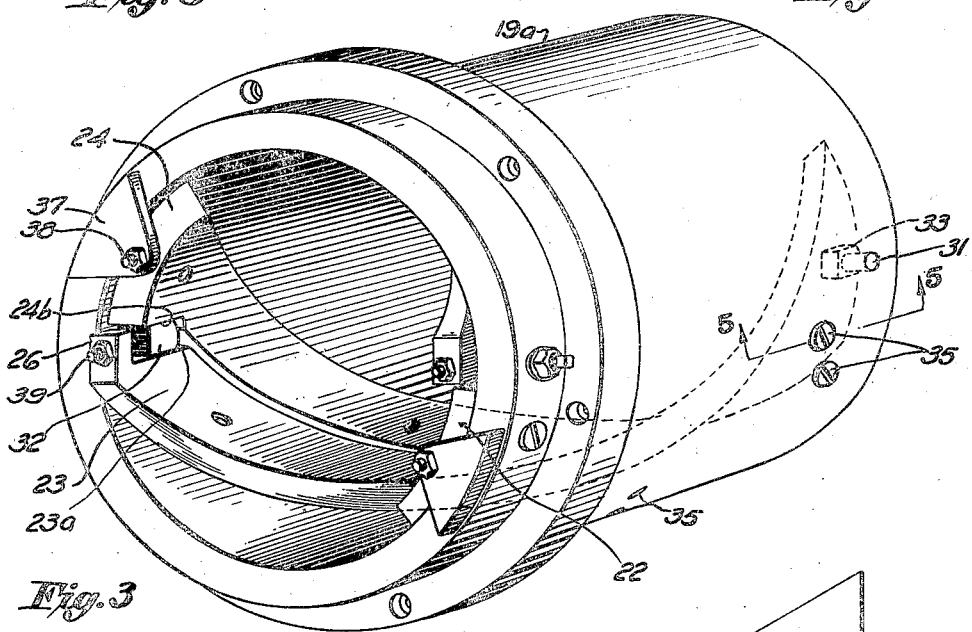
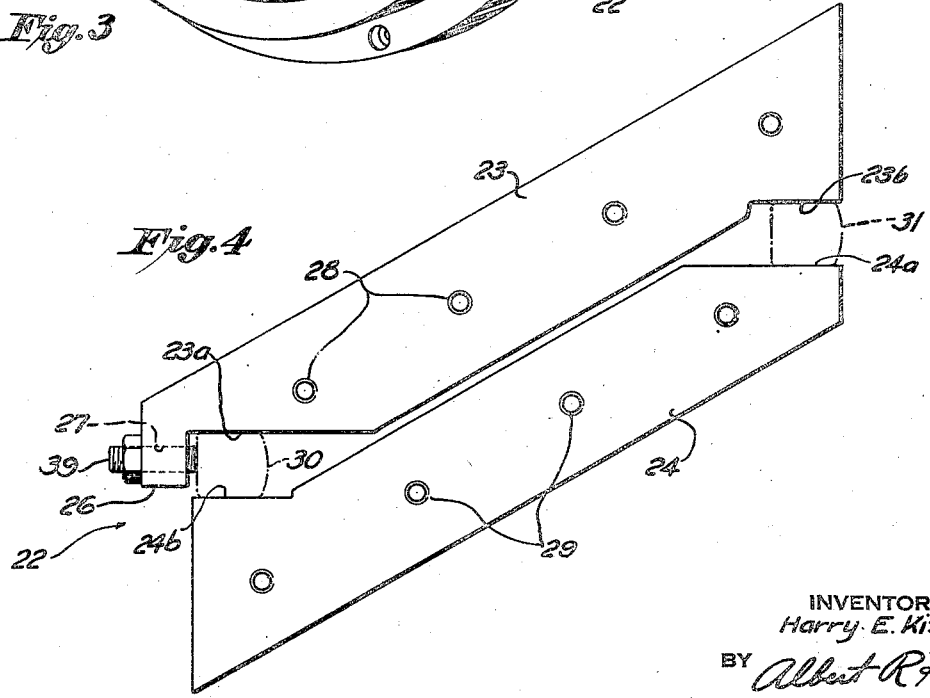
INVENTOR
Harry E. Kitchen
BY
ATTORNEY Patented Aug. 22, 1939

2,170,608

UNITED STATES PATENT OFFICE 2,170,608

GEAR GENERATOR

Harry E. Kitchen, Buffalo, N. Y., assignor to Farrel-Birmingham Company, Inc., Buffalo, N. Y.

Application December 21, 1938, Serial No. 247,072

5 Claims. (Cl. 74—568)

This invention relates to improvements in gear shapers of the molding-generating type.

The invention is directed to the mechanism which transmits rotary motion to the cutters during the reciprocatory or shaping action thereof, and it is more particularly directed to an improved key or shoe structure by which means the cutter shafts are slidably keyed to the indexing mechanism. Among the objects of the invention is the provision of a key structure which is capable of delicate adjustment to obtain the proper sliding fit in its keyway, and which is also adjustable to bring the guide into proper concentricity. As will be hereinafter apparent, the structure is inherently sturdy, so that the torsional stresses received thereby are absorbed without affecting the adjustments.

The invention is more specifically set forth in the appended specification and drawings, wherein:

Fig. 1 is a diagrammatic view of a Sykes type of gear generator, showing the location of the key structure of the invention;

Fig. 2 is an enlarged section on the line 2—2 of Fig. 1;

Fig. 3 is a perspective view of the left hand guide nut showing particularly the helical key structure thereof;

Fig. 4 is a view showing a development of the helical keys;

Fig. 5 is a fragmentary section on the line 5—5 of Fig. 3;

Figs. 6 and 7 are diagrammatic views showing eccentric and concentric positioning of the guide within the sleeve;

Fig. 8 is a development of a straight key structure.

For exemplary purposes, the invention is applied to a Sykes gear generator, which type of machine, as is well known in the art, operates on the molding-generating principle of action, wherein pinion type cutters 10 and 11 and the gear blank 12 are rotated as if in mesh, while the cutters are simultaneously reciprocated axially in alternate cutting strokes. As shown diagrammatically in Fig. 1, the cutters 10 and 11 are carried rotatably in reciprocating heads 13 and 14, and they are secured to shafts 15 and 16 respectively, which extend to the left where they are supplied with attached guides 17 and 18. The guides are slidably keyed within indexing worm wheel structures 19 and 20, which are rotated in unison to give the aforesaid rotary movement to the cutters. As will presently be apparent, the invention concerns improvements in the key structures of such devices.

In the cutting of helical gears, the cutters are given a third motion, that is, a helical twist during the operation. This is accomplished by providing helical keyways or cam formations 17a, 18a in guides 17, 18, which are received in complementary key formations in the worm wheel structures 19 and 20. Thus, as the slowly rotated guides and accompanying cutters slide axially within the worm wheel structures they receive additional screw-like motions. The key formations are carried in sleeves or nuts 19a, 20a, which form part of the worm wheel structures. The sleeves 19a, 20a are supplied with left and right hand key structures respectively, and since they are otherwise quite similar, a description of the former will suffice for the present purposes.

In the cutting of straight tooth gears, it will be apparent that the straight keys may be substituted for the described helical arrangement.

The sleeve 19a carries two identical key structures 22, which are diametrally opposed and firmly secured within the bore of the sleeve. Each structure is formed of two sections 23, 24 which when viewed in their developed or unbent form (Fig. 4), are parallelogrammic in outline, having in addition inner machined seats 23a, 23b, 24a, 24b. One section 23 is provided with a projecting extremity having a lug 26 formed thereon containing a tapped hole 27. Both sections are formed with a plurality of spaced tapped holes 28, 29.

Studs 30 and 31 are rigidly secured to the sleeve 19a and they are formed with square heads 32, 33, which project within the bore of the sleeve (Figs. 2 and 3). The studs serve as anchors for positioning the key sections 23, 24, whose inner machined seats 23a, 24a, 23b, 24b, engage the parallel flat surfaces of the studs. The key sections are secured to the sleeve by screws 35 which are positioned in axially extending slotted holes 36 in the sleeve and which enter the tapped holes 28, 29 (Fig. 5).

The outer end of the sleeve is fitted with lug members 37 having adjusting screws 38 which may be brought into engagement with the ends of the key sections 24. The tapped hole 27 of the section 23 carries a companion adjusting screw 39 which engages the underlying stud 30.

It will be observed that the seats 23a, 24a, and 23b, 24b of the key sections are lineal and disposed at such an angle to the helical surfaces that they assume an axial position in the sleeve. Thus, when it is desired to fit the keys with proper clearance to the guide keyways 17a, the holding screws 35 are loosened and the adjusting screws 38, 39 manipulated to move the key sections axially until the proper sliding fit between the key sections and keyways is obtained.

Due to the unyielding support afforded each section by the anchor studs 30 and 31, the keys are not only adjustable as individual units for proper keyway clearance, but are cooperatively adjustable to position the guide 17 in true concentric relation. This is best explained by reference to Fig. 6, where it will be seen that an improperly adjusted pair of key structures will cause the shaft-like guide to rest on the bottom of the sleeve out of eccentricity therewith. The amount of eccentricity is exaggerated in this view, the clearance actually being about .004 inch on the diameter. However, due to the exacting demands for accuracy in herringbone gears, the eccentricity may incur a perceptible error in the cutting process. In Fig. 7 there is shown a guide brought to proper concentric adjustment. It will be observed that the guide in effect hangs on the keys, which in turn are supported on the anchors. It will now be apparent that by adjustably sliding the key sections axially, a guide may be raised from the eccentric position of Fig. 6 to the true position of Fig. 7.

As shown in Fig. 8, the invention is equally applicable to the sleeve and guide structure when spur gears are cut. In this instance, the guides (not shown) are provided with straight or axial keyways, and the key sections 40, 41 are correspondingly straight, while the seats 40a, 40b, and 41a, 41b are angular relative to the sides of the key sections.

It is not intended that the invention be limited in use to the machine herein illustrated, as it will be obvious to those skilled in the art that the key structure may be used in various environments such as, for example, in a single spindle shaper. It will also be understood that the invention is not to be construed as being limited to diametrally opposed key structures, as in some instances it might be advantageous to use three or more key structures per guide, while in other machines one key structure might suffice.

I claim:

1. In a machine of the class described, a sleeve, a key structure comprising two parallel adjacent sections, the adjacent surfaces of the sections at each end thereof being formed with angular seats, anchor studs secured within the sleeve at opposite extremities thereof and disposed between said sections and engaged by said seats, and means securing the body of each section to the sleeve.

2. In a machine of the class described, a sleeve, a pair of key structures each comprising two parallel adjacent sections, the adjacent surfaces of each pair of sections being formed with angular parallel seats, anchor studs secured within the sleeve at opposite extremities thereof and disposed between said sections and engaged by said seats, said studs being disposed to mount said key structures in diametral opposition, and means for securing the body of each section to the sleeve.

3. In a machine of the class described, a sleeve, a key structure comprising two parallel adjacent sections, the adjacent surfaces of the sections at each end thereof being formed with angular parallel seats, anchor studs secured within the sleeve at opposite extremities thereof and disposed between the sections and engaged by said seats, means removably securing each section to the sleeve, and means for adjusting each section in directions aligned with said surfaces.

4. In a machine of the class described, a sleeve, a pair of key structures carried within said sleeve each comprising two parallel adjacent sections, said sections being formed so that the outer parallel walls of each pair of sections describe helical traces within said sleeve, the adjacent surfaces of each pair of sections being formed at each extremity with parallel seats, said seats being disposed axially, anchor studs secured within the sleeve at opposite extremities thereof and disposed between each pair of sections and engaged by said seats, and means for securing the body of each section to the sleeve.

5. In a machine of the class described, a sleeve, a key structure carried within the sleeve comprising two parallel adjacent sections, said sections being formed so that the outer parallel walls thereof describe helical traces within the sleeve, the adjacent surfaces of the sections being formed at each extremity with axially extending seats, anchor studs secured within the sleeve at opposite extremities thereof and disposed between the sections and engaged by said seats, one extremity of one section being formed with a projection having a lug thereon, an adjusting screw carried by the lug and axially contacting the adjacent anchor stud, a lug member secured to the end of the sleeve and carrying a screw axially engaging the remaining section, and means removably securing the body of each section to the sleeve.

HARRY E. KITCHEN.